W. GUTENKUNST.
LITTER CARRIER.
APPLICATION FILED OCT. 4, 1915.
1,215,523.
Patented Feb. 13, 1917.
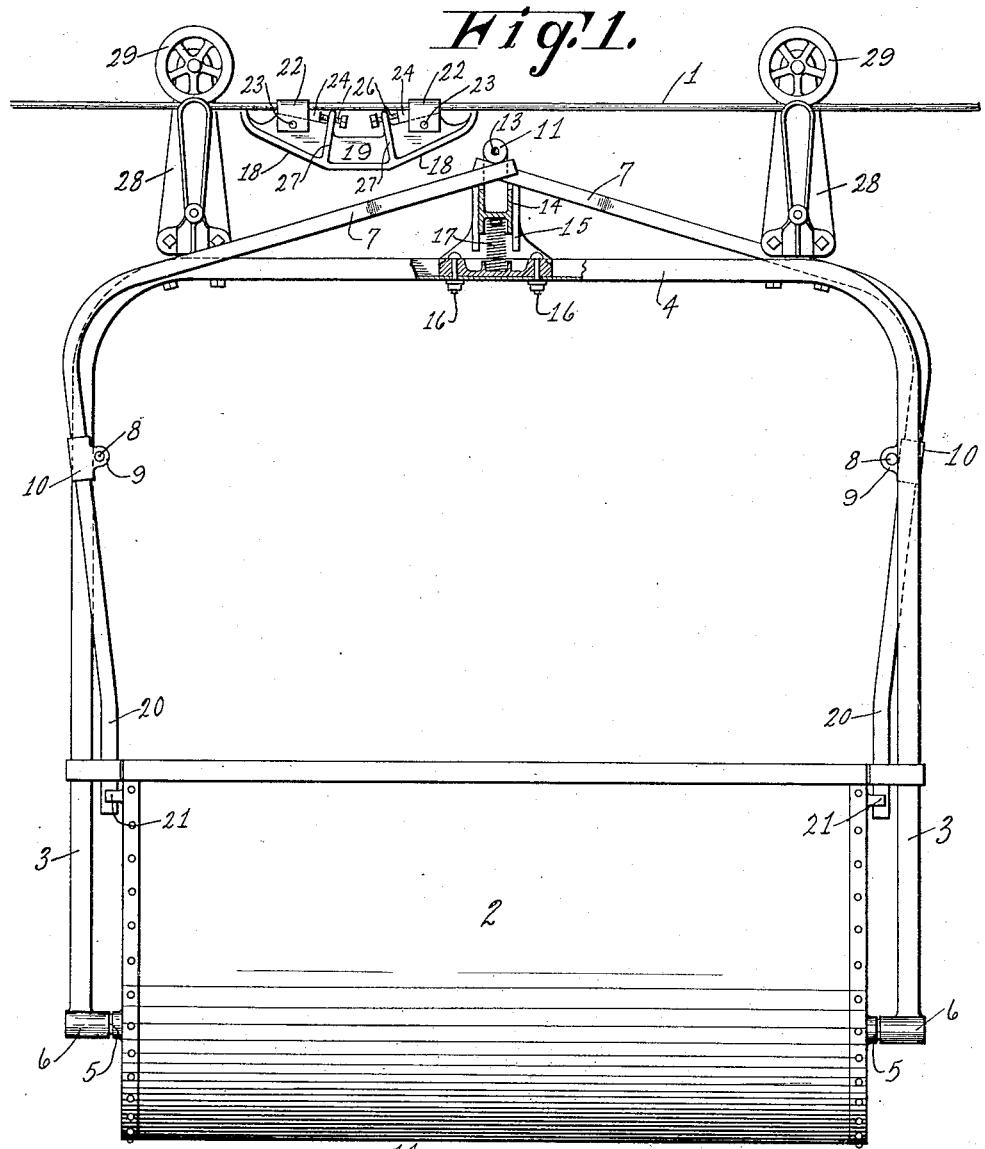
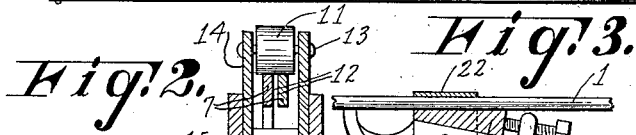
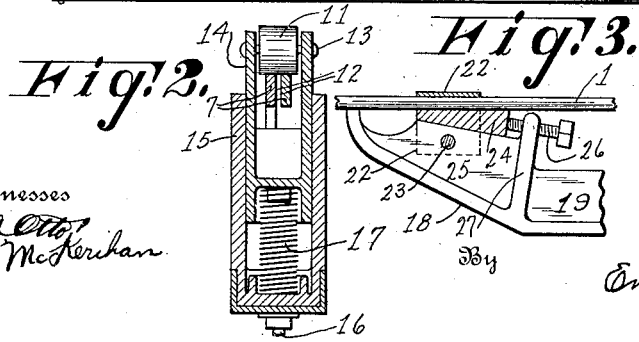

UNITED STATES PATENT OFFICE.

WILLIAM GUTENKUNST, OF MILWAUKEE, WISCONSIN.

LITTER-CARRIER.

1,215,523.  Specification of Letters Patent.  Patented Feb. 13, 1917.

Application filed October 4, 1915. Serial No. 53,874.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Litter-Carriers, of which the following is a specification.

My invention relates to improvements in that class of litter carriers for which Letters Patent No. 961,493 were issued to me June 14, 1910, and it pertains, more especially among other things, to the trip mechanism for holding the litter receptacle in a vertical position between the respective ends of its supporting bail and for automatically releasing such receptacle and permitting the same to be inverted at any desired point beneath the supporting track.

My invention is further explained by reference to the accompanying drawing, in which—

Figure 1 represents a front view, part in section, of the litter carrier as it appears when suspended in its upright position between the lower ends of the bail beneath the supporting track.

Fig. 2 is a vertical section of a portion of the trip mechanism which is carried by the bail, and Fig. 3 is a detail part in section showing the device for rigidly securing a portion of the trip mechanism to the track or cable with which it is connected.

Like parts are identified by the same reference numerals throughout the several views.

1 is a track or cable upon which my litter carrier is suspended and operated. 2 is the receptacle in which the litter is carried to the place of deposit. The receptacle 2 is suspended from the track 1 by the bail which comprises the two vertical arms 3, 3 and the horizontal connecting member 4. The lower ends of the bail are connected with the respective ends of the receptacle 2 by the trunnions 5, 5 and sleeves 6, 6. The trunnions 5, 5 are both rigidly connected at one end to said receptacle 2 and the sleeves 6, 6 are respectively connected or formed integral with the lower ends of the arms 3, 3. The receptacle 2 is normally retained in its upright position, shown in Fig. 1 by the two armed levers 7, 7, and said levers 7, 7 are respectively pivotally connected with the arms 3, 3 of the bail by the pivotal bolts 8, 8, lugs 9, 9 and sleeves 10, 10, while the levers 7, 7 may, if desired, be both located on the same side of the bail I preferably locate one upon the front side of the bail, as shown upon the left of Fig. 1, and the other upon the rear side of the bail, as shown upon the right in said Fig. 1. The upper ends of the lever 7 are adapted to cross each other beneath the roller 11, as shown in said Fig. 1, and said roller 11 is revolubly supported above the crossed ends 12 of said levers upon the bolt 13, and said bolt is revolubly supported at its respective ends from the bracket 14. The bracket 14 has slidable bearings in the bracket 15, and said bracket 15 is rigidly connected with the center of the bail 4 by a plurality of bolts 16, 16. 17 is a spiral spring which is interposed between the lower end of the bracket 15 and the slidable bracket 14, and said spring is adapted by its recoil to raise the roller 11, whereby the same is adapted to contact with the respective sides, 18, 18 of the bracket 19, and whereby as said roller is raised the crossed upper ends of the levers 7 are also raised thereby causing the lower ends 20, 20 of said levers to enter the space between the outwardly projecting lugs 21, 21, which are formed integral with or connected rigidly to the respective ends of the receptacle 2 near its upper edge, as shown in Fig. 1.

It will be understood that each end of the receptacle 2 is provided with two outwardly projecting lugs 21 of substantially like construction, and that such lugs 21 are located at slight distances apart leaving a narrow space for the reception of the lower ends of the levers 7. Said Fig. 1, however, shows but one of said lugs located at each end of the receptacle 2, but it will be readily understood that a similar lug to that shown at 21 is located in close proximity thereto upon the opposite side of the levers 7 to that shown in Fig. 1. The bracket 19 is connected with the rod 1 by a plurality of loops 22, 22 and loop retaining pins 23, 23. Experience has, however, proven that when said bracket 19 is connected with the track or cable 1 by loops only as shown in my said previous patent said bracket 19 is liable to turn on its supporting track or cable and get out of alinement with the roller 11, and to obviate this difficulty I have provided the bracket 19 with a plurality of wedge shaped members 24, 24 which are interposed between the member 25 and said track 1, and said wedge members 24 are each forced forwardly between said track 1 and the member 25 by the screw threaded bolts 26. Said bolts 26 have threaded bearings in the arms 27 of said bracket 19.

It will now be understood that as said bolts 26 are turned forward in their threaded bearings said wedge members 24 will be forced forward and in impinging contact with said cable 1 and bracket 19, whereby said bracket is rigidly retained in place and prevented from turning on its supporting track.

It will, of course, be understood that the bail 4 is connected with the track 1 by a plurality of hangers 28, 28 and rollers 29, 29, and as said hangers and rollers are connected with said bail and track in the ordinary manner they need not be herein further explained.

Having thus described my invention, what I claim as new and desire to secure by Letters Patent, is:—

1. In a litter carrier, a receptacle, a pivoted bail therefor, a pair of levers pivoted to the bail, extending upwardly and overlapping at their upper ends, a fixed bracket on the bail, a second bracket slidable in the fixed bracket, a spring interposed between the two brackets, a passageway in the sliding bracket through which the upper ends of the levers extend, and a contact bearing located at the top of the slidable bracket.

2. In a litter carrier, a receptacle, a pivoted bail therefor, a pair of levers pivoted to the bail, extending upwardly and overlapping at their upper ends, a fixed bracket on the bail, a second bracket slidable in the fixed bracket, a spring interposed between the two brackets, a passageway in the sliding bracket through which the uppers ends of the levers extend, and a roller at the top of the slidable bracket and forming one side of said passageway.

In testimony whereof I affix my signature in the presence of two witnesses.

WILLIAM GUTENKUNST.

Witnesses:
 JAS. B. ERWIN,
 IRMA D. BREMER.

Copies of this patent may be obtained for five cents each, by addressing the "Commissioner of Patents, Washington, D. C."